(12) United States Patent
Chung

(10) Patent No.: US 8,775,780 B2
(45) Date of Patent: Jul. 8, 2014

(54) SYSTEM FOR MULTI-BOOT OF A CENTRAL PROCESSING UNIT USING INTERNAL REGISTERS THAT DIRECT AN OPERATING SYSTEM TO BOOT INTO DISJOINT MEMORY SPACES

(76) Inventor: Keicy Chung, Torrance, CA (US)

(*) Notice: Subject to any disclaimer, the term of this patent is extended or adjusted under 35 U.S.C. 154(b) by 108 days.

(21) Appl. No.: 12/714,906

(22) Filed: Mar. 1, 2010

(65) Prior Publication Data

US 2010/0223452 A1    Sep. 2, 2010

Related U.S. Application Data

(60) Provisional application No. 61/156,152, filed on Feb. 27, 2009.

(51) Int. Cl.
*G06F 9/24* (2006.01)
*G06F 15/177* (2006.01)

(52) U.S. Cl.
USPC .................................................. 713/2; 713/1

(58) Field of Classification Search
CPC ................................. G06F 9/24; G06F 15/177
USPC ........................................................ 713/2, 1
See application file for complete search history.

(56) References Cited

U.S. PATENT DOCUMENTS

| | | | |
|---|---|---|---|
| 6,173,417 B1* | 1/2001 | Merrill | 714/15 |
| 6,260,114 B1* | 7/2001 | Schug | 711/129 |
| 6,493,800 B1* | 12/2002 | Blumrich | 711/129 |
| 6,654,880 B1* | 11/2003 | Yamamoto | 713/1 |
| 2002/0184482 A1* | 12/2002 | Lacombe et al. | 713/1 |
| 2005/0114687 A1* | 5/2005 | Zimmer et al. | 713/193 |
| 2008/0140971 A1* | 6/2008 | Dankel et al. | 711/163 |

* cited by examiner

*Primary Examiner* — Thomas Lee
*Assistant Examiner* — Terrell Johnson
(74) *Attorney, Agent, or Firm* — The Belles Group, P.C.

(57) ABSTRACT

A central processing unit capable of multi-boot using disjoint memory spaces. The central processing unit comprises a plurality of internal registers communicably coupled to each of a plurality of disjoint memory spaces. The internal registers may be configured to designate one or more of the memory spaces as an active memory space or a standby memory space.

22 Claims, 3 Drawing Sheets

SYSTEM FOR MULTI-BOOT OF A CENTRAL PROCESSING UNIT USING INTERNAL REGISTERS THAT DIRECT AN OPERATING SYSTEM TO BOOT INTO DISJOINT MEMORY SPACES

PRIORITY

Priority is claimed to U.S. provisional patent application Ser. No. 61/156,152, filed Feb. 27, 2010. The disclosure of the aforementioned priority document is incorporated herein by reference in its entirety.

BACKGROUND OF THE INVENTION

1. Field of the Invention

The field of the present invention is central processing units (CPU) for computing devices.

2. Background

A typical computing device, whether it is a personal computer, an embedded computer, a hand-held PDA, a smart phone, or any other type, runs an operating system that is responsible for managing the hardware and various applications. Because of numerous vulnerabilities inherent in today's operating systems and applications, typical computing devices are susceptible to malicious code, such as viruses and spyware. In general, there are two kinds of malicious code.

One kind of malicious code attacks executable files or saves itself on a storage device so it can be resident on the computing device and can spread to other computing devices, usually over a network. This kind of malicious code can usually reload itself to the computing device's memory when the computing device is booted. There are numerous methods to deal with this kind of malicious code, such as anti-virus or anti-spyware programs.

The other kind of malicious code is only resident in the memory of a computing device. This kind of malicious code (memory-resident code) is usually very small in size, often gains administrative privileges, and usually cannot be detected and removed easily as it mimics itself with the operating system.

Regardless of the kind, the malicious code active in the memory may be eliminated by rebooting the computing device. As long as the operating system files and applications are obtained from a clean source (i.e. the operating system files and applications stored in a hard disk are not altered by malicious codes, such as viruses or spyware), a reboot will get rid of any malicious code in the memory.

However, rebooting a computing device usually takes time—from a few seconds for simple devices to several minutes for the more complex devices. While rebooting, the computing device is not operational. This is a major issue when the computing device (i.e. mission critical system, smart phone, etc.), needs to be running almost constantly and cannot have much, if any, downtime

SUMMARY OF THE INVENTION

The present invention is directed toward a central processing unit (CPU) for computing devices. The central processing unit comprises a plurality of internal registers communicably coupled to a plurality of disjoint memory spaces. The internal registers are configured to designate one or more of the memory spaces as an active memory space and one or more of the memory spaces as a standby memory space. The internal registers may be configured to prevent machine instructions in the active memory space from accessing the standby memory space.

As an option, a memory manager may communicably couple the plurality of disjoint memory spaces to the internal registers. The memory manager may be incorporated into the CPU or it may be a separate component. The memory manager may be configured to convert the plurality of disjoint memory spaces to a single addressable memory space at specified times during operation. For example, the memory manager may be configured to form a mirrored-pair of memory spaces during the boot process so an operating system may be booted into each memory space of the mirrored-pair simultaneously. Once the boot process is complete, the memory manager converts the mirrored-pair of memory spaces to disjoint memory spaces. The memory manager may also be configured to flush the standby memory space before it is booted with an operating system. The memory manager may also be configured to track defective memory spaces to prevent their use.

Accordingly, a central processing unit capable of multi-boot using disjoint memory spaces is disclosed. Advantages of the improvements will appear from the drawings and the description of the preferred embodiments.

BRIEF DESCRIPTION OF THE DRAWINGS

In the drawings, wherein like reference numerals refer to similar components.

DETAILED DESCRIPTION OF THE PREFERRED EMBODIMENTS

As used herein, "memory" refers to any type of random access memory that a central processing unit may use to save, process, and execute code and/or data. The memory may either be volatile (it loses its contents when there is no power) or non-volatile (it does not lose its contents even when there's no power). A storage device may hold data and executable code, such as an operating system and applications. A storage device may be read-only, read-write, or any combination thereof. A hard disk drive, a CD-ROM, and a flash drive are some examples of storage devices. Some storage devices with read-write capabilities can be configured to function as memory.

Figure 1:
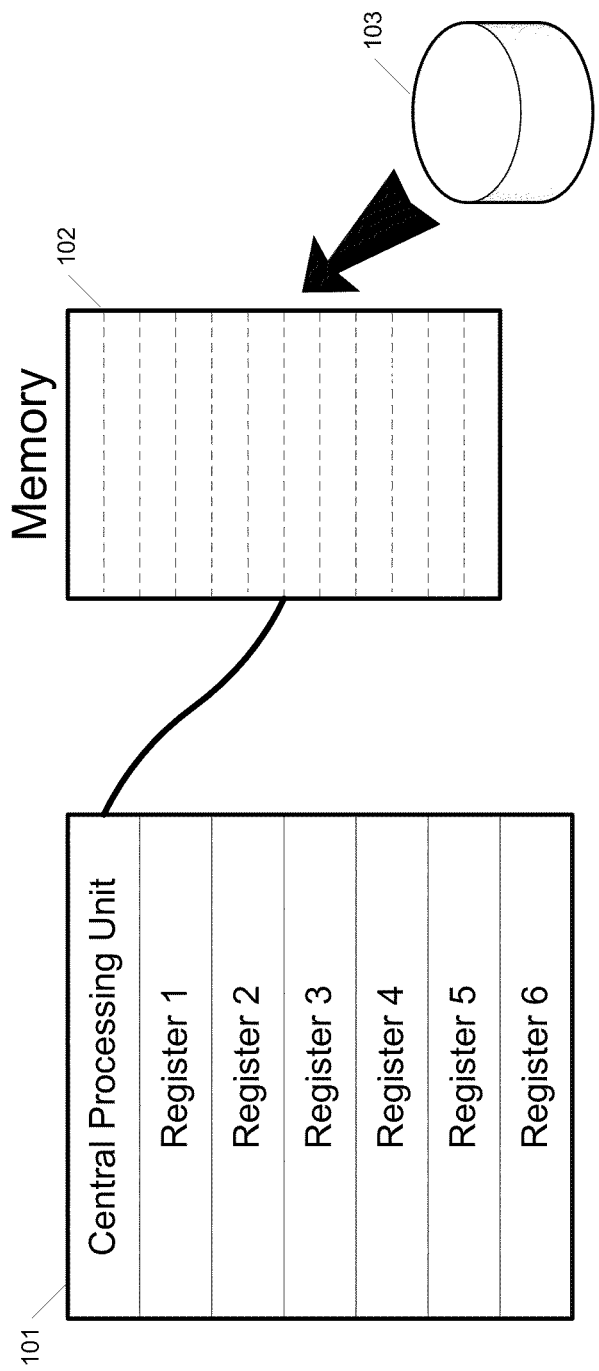
FIG. 1 schematically illustrates a computing device incorporating a CPU according to the prior art.

Turning in detail to the drawings, FIG. 1 is representative of a typical computing device as exhibited in the prior art. The computing device includes a central processing unit 101, a memory 102, and a storage device 103. The central processing unit 101 executes codes and processes data in a prescribed manner, often referred to as machine instructions, utilizing its internal registers 1-6. The central processing unit 101 has an addressable memory space that can be anywhere between a few bytes to a few terabytes, or more, depending on design considerations for the computing device. The memory 102 may fill up an entire addressable memory space or only a portion of it, which is a typical case in most of today's computing devices. The memory 102 is usually volatile (i.e., in case of a PC), but it may be non-volatile (i.e., in case of a solid-state computing device that holds its running state when the power is off but may resume its operation when the power is back on). A portion of the addressable memory space may also be occupied by a read-only memory, such as a firmware or a BIOS, from which a computing device starts the boot process when powered on or reset.

During the typical boot process, the central processing unit 101 executes basic codes stored in firmware or the BIOS. Then the central processing unit 101 continues the boot process by loading an operating system from the storage device 103, utilizing the memory 102 of the computing device. That is, the operating system's executable codes and data are stored in the memory 102 so the central processing unit 101 may run the operating system from the memory 102. Likewise, applications are loaded and unloaded from the memory as needed so the central processing unit 101 may run applications from the memory 102 or terminate them.

For normal and secure use of the computing device, the operating system and applications loaded from the storage device 103 need to be free of any malicious codes, such as viruses or spyware. The operating system and applications may be protected in many ways, for instance, by utilizing anti-virus/anti-spyware programs or incorporating a read-only storage device of U.S. Pat. Nos. 7,069,351 and 7,444,393 in the computing device.

However, the computing device may still be vulnerable to malicious codes as the memory may be infected while the computing device is in use. For example, a PC user may visit a malicious website and accidentally download a memory-resident virus that leaks personal information to the Internet. If such virus is a new breed yet to be blocked by an anti-virus program, it may be completely undetected. Such a memory-resident virus may easily be removed from memory by rebooting the PC. Nevertheless, rebooting the PC usually takes time and is inconvenient to the user. In the case of a mission critical system or a smart phone, which require a high rate of uptime, rebooting is impractical to get rid of possible but undetected malicious codes from the memory.

Figure 2:
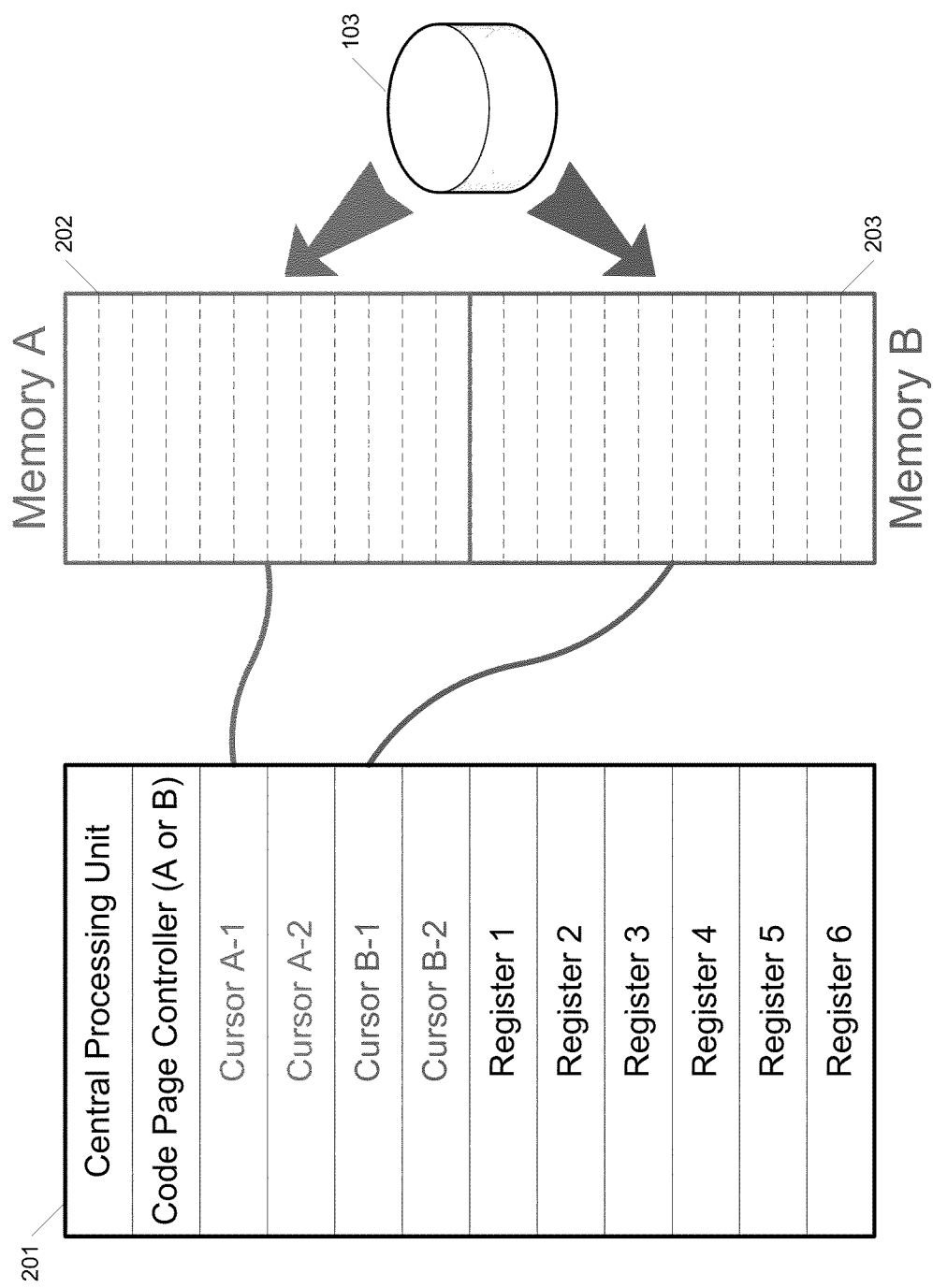
FIG. 2 schematically illustrates a computing device incorporating a CPU having internal registers configured to switch the CPU between active and standby memory spaces.

FIG. 2 illustrates a central processing unit (CPU) 201 capable of multi-boot using disjoint memory spaces 202, 203. While only two memory spaces are shown and discussed, the CPU 201 may have access to any number of disjoint memory spaces. The central processing unit 201 includes a code page controller that designates one of the memory spaces as an active memory space and the other of the memory spaces as a standby memory space. When more than two disjoint memory spaces are present, the CPU may designate at least one active memory space and at least one standby memory space. As is described in further detail below, these designations may be switched during operation, i.e., the initially designated active memory space becomes the standby memory space, and the initially designated standby memory space becomes the active memory space. The central processing unit also includes a set of cursors (one or more for each memory space) that track machine instruction entry points to each of the active and standby memory spaces. As depicted, cursors A-1, A-2 track the entry point of Memory A 202 whereas cursors B-1, B-2 track the entry point of Memory B 203. The code page controller and the cursors act as a controlling mechanism to track the flip/flop of the physical paths to Memory A 202 and Memory B 203 so the CPU 201 uses only one memory space at a time. The use of the code page controller and the cursors is exemplified below:

a) During the initial power on of the computing device, the central processing unit 201 directs an operating system to boot into Memory A 202. Cursors A-1, A-2 are configured to track machine instructions to Memory A 202. Memory A 202 would be designated an active memory space (i.e., a memory space which is currently in use).

b) While Memory A 202 is active, the central processing unit directs an operating system (which may be the same kind or a different kind of operating system that was booted into Memory A 202) to boot into Memory B 203 (preferably utilizing an idle loop included as part of the CPU). Cursors B-1, B-2 are configured to track machine instructions to Memory B 203. Memory B 203 would be designated a standby memory space.

c) As needed systematically or programmatically, the central processing unit 201 may switch Memory B 203 to an active memory space while switching Memory A 202 to a standby memory space (i.e., a memory space which is not currently in use by the CPU, but may be redesignated as an active memory space upon demand).

d) In some cases (e.g., a smart phone that may need to have the same running state of memory spaces), reloading a standby memory space is desirable. For instance, while Memory B 203 is active, the central processing unit 201 flushes out Memory A 202 and reboots the operating system to Memory A 202 (again, preferably utilizing the processor's idle loop) while using the corresponding cursors A-1, A-2, B-1, and B-2 to track machine instructions. Memory A 202 would now be designated a standby memory space.

In other cases, for instance, multi-boot scenarios, (i.e., where the memory spaces are loaded with different types of operating systems) a standby memory space would not be flushed automatically. Flushing in these cases may be handled by a machine instruction (i.e., operating system) running on the corresponding memory space. The machine instruction at an entry point may choose to reload the memory space (i.e., a warm reboot) or may choose to have an idle loop.

e) As needed, either systematically or programmatically, the central processing unit 201 may switch Memory A 202 to an active memory space while switching Memory B 203 to a standby memory space.

f) The process continues to maintain the memory spaces free of any memory-resident malicious codes.

During the switching and redesignation of memory spaces, the central processing unit 201 needs to clear its internal registers 1-6, other than the code page controller and cursors A-1, A-2, B-1, and B-2, so a new set of machine instructions may be loaded from the now-active memory space based on the entry point kept by the corresponding cursors of that memory space. Clearing internal registers 1-6 can be done by executing preset machine instructions, such as a call to a subroutine that uses XOR to clear registers (i.e., XOR AX, AX on Intel x86 family processors). The central processing unit 201 also may need to clear any memory buffer (often referred as L2 cache memory) if such memory buffer is shared to cache machine instructions from multiple memory spaces. That is, if the same memory buffer is used to cache machine instructions from an active memory space, the memory buffer would need to be cleared so that no machine instructions or data from the currently active memory space can cross over to the standby memory space via the memory buffer. This is a well-known process on central processing units as a "jump" machine instruction would trigger flushing and/or reloading of a memory buffer. Thus, once the entry point to a memory space is identified (i.e., the machine instruction from which processing should continue is identified), any internal registers or memory buffer would be cleared without much complication to eliminate the chance of a malicious code crossing from the active memory space to the standby memory space.

The switching of memory spaces is controlled so the switching does not cause operating system errors or application errors. There are numerous ways of controlling the switching, mostly depending on the functionality of the computing device incorporating the CPU. Switching may be triggered by a hardware switch, a clock-generated event, or an acceptable method incorporated into the operating system. In the case of a personal computer, the central processing unit may alert the operating system (for instance, by setting a register that the operating system routinely checks). Once an alert is received, the operating system can warn the user so the user can save its work and kill unnecessary processes to prepare for a memory space switch. In the case of a smart phone which usually suspends all applications and puts itself in standby mode when it is not in use, the switching may be programmed to occur at a specified time.

Certain central processing units available today utilize a technique called protected mode in which the central processing unit programs an operating system to divide the memory into several sections, and assigns a section to an application or a process in such a way that the application or the process is confined to the assigned section only and is not allowed to have access to other memory sections. Thus, the application or process is effectively isolated from other applications or processes. This may seem to have the same advantages as the current CPU disclosed herein. However, the protected mode would not be able to provide adequate isolation of applications or processes as the protected mode is operating system dependent. In other words, if the operating system is compromised by a virus or spyware, then malicious code (which is supposed to be confined to a memory section) may gain access to other memory sections and spread itself. In contrast, the CPU disclosed herein is operating system independent; meaning that, even if the active memory space (e.g., Memory A 202) is compromised by a malicious code, the standby memory space (e.g., Memory B 203) is completely protected as the CPU itself limits the malicious code from reaching the standby memory space.

Figure 3:
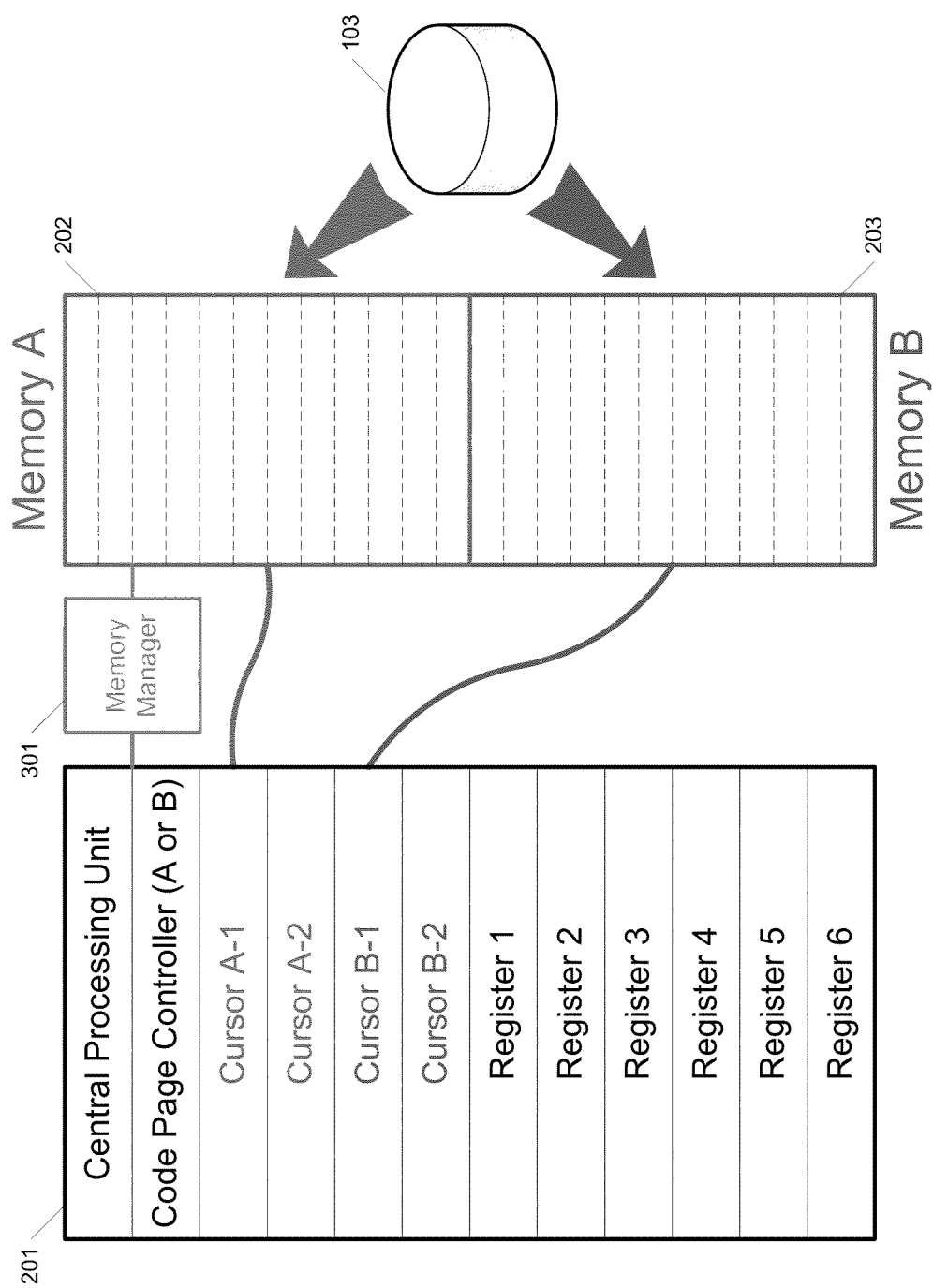
FIG. 3 schematically illustrates the computing device of FIG. 2 further incorporating a memory manager.

FIG. 3 illustrates a CPU 201 coupled to a memory manager. The memory manager 301 is utilized to enhance the management of active and standby memory spaces. Optionally, the memory manager may be integrated into the central processing unit. The use of the memory manager 301 is exemplified below:

a) The memory manager 301 is configured to form a single memory space (i.e., completely addressable as whole) by stacking the disjoint memory spaces, Memory A 202 and Memory B 203, together. Then a code page controller and the cursors A-1, A-2, B-1, B-2, are idle as the central processing unit 201 functions in a normal mode utilizing the memory space as whole. This happens only once during the initial boot process so the disjoint memory spaces, Memory A 202 and Memory B 203, do not form a continuous memory space (i.e., completely addressable as a whole) while the computing device is operational.

b) The memory manager 301 is configured to form a mirrored-pair of memory spaces during the boot process so an operating system may be booted into each memory space of the mirrored-pair simultaneously. Once the boot process is complete, the memory manager then breaks the mirrored-pair of memory spaces to obtain two disjoint memory spaces, each now fully loaded with an operating system. This also happens only once during the booting process so malicious code cannot form a mirrored-pair of the memory space while the computing device is operational—if malicious code can form a mirrored-pair of the memory space and break at will, then it can effectively infect other memory spaces.

c) The memory manager 301 is configured to perform pre-loading processes, such as flushing a memory space before Memory A 202 or Memory B 203 is reloaded with an operating system and applications, relieving the central processing unit 201 from such processes. The memory manager 301 may also be configured to run diagnostics on Memory A 202 and Memory B 203 to track and prevent their use when defective.

Thus, a computer processing unit having switchable access between active and standby memories is disclosed. While embodiments of this invention have been shown and described, it would be apparent to those skilled in the art that many more modifications are possible without departing from the inventive concepts herein. The invention, therefore, is not to be restricted, except in the spirit of the following claims.

What is claimed is:

1. A central processing unit comprising:
first internal registers configured for use in executing machine instructions;
second internal registers communicably coupled to a plurality of disjoint memory space wherein the second internal registers are configured to designate one or more of the memory spaces as an active memory space and to designate one or more of the memory spaces as a standby memory space, and to switch designation of the one or more active memory spaces to standby while switching designations of the one or more standby memory space to active,
wherein the respective switch in designations between the memory spaces triggers clearing of the first internal registers and loading of machine instructions into the first internal registers from the one or more of the memory space being redesignated as the active memory space, the clearing and loading occurring before the first internal registers access the memory space redesignated to active,
wherein the second internal registers are further configured to direct an operating system to boot into the inactive memory space during processor idle time with respect to the active memory space.

2. The central processing unit of claim 1, wherein the second internal registers are further configured to prevent machine instructions in the active memory space from accessing the standby memory space.

3. The central processing unit of claim 1, wherein the second internal registers are further configured to direct an operating system to boot into the active memory space.

4. The central processing unit of claim 1, wherein the second internal registers are further configured to track machine instruction entry points corresponding to each of the active and standby memory spaces.

5. The central processing unit of claim 1, further comprising a memory manager communicably coupling the plurality of disjoint memory spaces to the second internal registers.

6. A central processing unit comprising:
first internal registers configured for use in executing machine instructions:
second internal registers communicably coupled to a plurality of disjoint memory spaces, wherein the internal registers are configured to designate one or more of the memory spaces as an active memory space and to designate one or more of the memory spaces as a standby memory space, and to switch designation of the one or more active memory spaces to standby while switching designations of the one or more standby memory space to active, wherein the respective switch in designation between the memory spaces triggers clearing of the first internal registers and loading of machine instructions into the first internal registers from the one or more of the memory space being redesignated as the active memory space, the clearing and loading occurring before the first internal registers access the memory space redesignated to active, and wherein a memory manager communicably couples the plurality of disjoint memory spaces to the first and second internal registers;

wherein the second internal registers are further configured to direct an operating system to boot into the standby memory space during processor idle time with respect to the active memory space.

7. The central processing unit of claim 6, wherein the second internal registers are further configured to prevent machine instructions in the active memory space from accessing the standby memory space.

8. The central processing unit of claim 6, wherein the second internal registers are further configured to direct an operating system to boot into the active memory space.

9. The central processing unit of claim 6, wherein the second internal registers are further configured to track machine instruction entry points corresponding to each of the active and standby memory spaces.

10. The central processing unit of claim 6, wherein the memory manager is configured to convert the first and second memory spaces to a single addressable memory space.

11. The central processing unit of claim 6, wherein the memory manager is configured to form a mirrored-pair of memory spaces during the boot process from the first and second memory spaces, and to subsequently convert the mirrored-pair of memory spaces to disjoint memory spaces, so that each disjoint memory space is loaded with an operating system.

12. The central processing unit of claim 6, wherein the memory manager is configured to flush the standby memory space before the standby memory space is loaded with an operating system.

13. The central processing unit of claim 6, wherein the memory manager is configured to track defective memory spaces.

14. A programmable system comprising:
a first memory space;
a second memory space which is disjoint from the first memory space; and
a central processing unit comprising first internal registers and second internal registers, the first and second internal registers being communicably coupled to the first memory space and to the second memory space; wherein:

the second internal registers are configured to designate one of the first memory space and the second memory space as an active memory space and to designate the other memory space as a standby memory space, and to switch designation of the active memory space to standby while switching designation of the standby memory space to active; and the first internal registers are configured for use in executing machine instructions in the active memory space, wherein the central processing unit is configured to clear the first internal registers upon the respective switch in designations between the memory spaces, and to load machine instructions from the memory space being redesignated to active into the first internal registers, the clearing and the loading occurring before the second internal registers access the memory space redesignated to active;

wherein the second internal registers are further configured to direct an operating system to boot into the standby memory space during processor idle time with respect to the active memory space.

15. The programmable system of claim 14, wherein the second internal registers are further configured to prevent machine instructions in the active memory space from accessing, the standby memory space.

16. The programmable system of claim 14, wherein the second internal registers are further configured to direct an operating system to boot into the active memory space.

17. The programmable system of claim 14, wherein the second internal registers are further configured to track machine instruction entry points corresponding to each of the active and standby memory spaces.

18. The programmable system of claim 14, wherein a memory manager communicably couples the plurality of disjoint memory spaces to the first and second internal registers.

19. The central processing unit of claim 18, wherein the memory manager is configured to convert the first and second memory spaces into a single addressable memory space.

20. The central processing unit of claim 18, wherein the memory manager is configured to form a mirrored-pair of memory spaces during the boot process form the first and second memory spaces, and to subsequently convert the mirrored-pair of memory spaces to disjoint memory spaces, so that each disjoint memory space is loaded with an operating system.

21. The central processing unit of claim 18, wherein the memory manager is configured to flush the standby memory space before the standby memory space is loaded with an operating system.

22. The central processing unit of claim 18, wherein the memory manager is configured to track defective memory spaces.

* * * * *